(12) United States Patent
Park

(10) Patent No.: US 9,420,416 B2
(45) Date of Patent: Aug. 16, 2016

(54) SYSTEM FOR PROVIDING PARKING INFORMATION

(71) Applicant: HYUNDAI MOTOR COMPANY, Seoul (KR)

(72) Inventor: Un Kyu Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/539,846

(22) Filed: Nov. 12, 2014

(65) Prior Publication Data

US 2016/0019789 A1 Jan. 21, 2016

(30) Foreign Application Priority Data

Jul. 17, 2014 (KR) .................. 10-2014-0090554

(51) Int. Cl.
*B60Q 1/48* (2006.01)
*G08G 1/14* (2006.01)
*H04W 4/02* (2009.01)
*G06Q 30/02* (2012.01)
*G06Q 10/02* (2012.01)

(52) U.S. Cl.
CPC ............... *H04W 4/02* (2013.01); *G06Q 10/02* (2013.01); *G06Q 30/02* (2013.01); *G08G 1/143* (2013.01); *G08G 1/144* (2013.01); *G08G 1/146* (2013.01)

(58) Field of Classification Search
CPC ......... G08G 1/14; G08G 1/141; G08G 1/143; G08G 1/144; G06Q 30/02
USPC ............................. 340/932.2; 235/378; 705/13
See application file for complete search history.

(56) References Cited

U.S. PATENT DOCUMENTS

| 8,630,897 | B1 | 1/2014 | Prada Gomez et al. | |
|---|---|---|---|---|
| 2011/0015934 | A1* | 1/2011 | Rowe et al. | 340/932.2 |
| 2011/0270669 | A1* | 11/2011 | Rowe et al. | 340/932.2 |
| 2012/0299749 | A1* | 11/2012 | Xiao et al. | 340/932.2 |
| 2014/0129132 | A1 | 5/2014 | Yoshizu | |
| 2014/0292541 | A1* | 10/2014 | Korman | 340/932.2 |

FOREIGN PATENT DOCUMENTS

| JP | 2005-071011 A | 3/2005 |
|---|---|---|
| KR | 10-2004-0082672 A | 9/2004 |
| KR | 10-1150750 B1 | 7/2012 |
| KR | 10-2013-0090207 A | 8/2013 |
| KR | 2014-0087080 A | 7/2014 |
| WO | 2013/005299 A1 | 1/2013 |

* cited by examiner

Primary Examiner — John A Tweel, Jr.
(74) Attorney, Agent, or Firm — McDermott Will & Emery LLP

(57) ABSTRACT

A system for providing parking information includes: a wireless terminal configured to detect a current position of a vehicle and wirelessly perform data communication; and a server configured to receive a driving destination of the vehicle from the wireless terminal and control information about parking lots around the driving destination, in which the server may update and store the information on the parking lots in real time and respond to a request of the wireless terminal to transmit at least one of parking available information and parking fee information at the parking lots or parking service information provided by shops or service providers associated with the parking lots to the wireless terminal in real time.

8 Claims, 2 Drawing Sheets

SYSTEM FOR PROVIDING PARKING INFORMATION

CROSS-REFERENCE TO RELATED APPLICATION

This application claims under 35 U.S.C. §119a the benefit of priority to Korean Patent Application No. 10-2014-0090554, filed on Jul. 17, 2014 in the Korean Intellectual Property Office, the entire contents of which are incorporated herein by reference.

TECHNICAL FIELD

The present disclosure relates to a system for providing parking information, and more particularly, to a system for providing parking information capable of providing parking available information of a specific area and parking service information provided from shops or service providers around the specific area to users in real time.

BACKGROUND

Generally, in order to help lots of vehicles be parked in areas like a big department store, a shopping center, a concert hall, and a stadium, which have a lot of floating population, a large parking lot, a parking building, etc., are positioned in the areas.

The large parking lot or the parking building may efficiently accommodate lots of vehicles but has a difficulty in levying a parking fee for the management and use of a parking lot.

To resolve the difficulty, an unmanned automatic parking management system performing various functions has been developed.

The unmanned automatic parking management systems may have a slightly different configuration, but are substantially similarly operated in a function of automatically issuing a parking ticket and automatically charging a parking fee from an entrance time to an exit time of a vehicle.

Recently, a system for recognizing a vehicle number by photographing an incoming vehicle and an outgoing vehicle without issuing a separate parking ticket and automatically charging a parking fee from an entrance time to an exit time of a vehicle based on the recognition has also been provided.

As such, a camera, and the like for automatically recognizing a vehicle number of a vehicle entering and exiting from a parking lot using a vehicle number recognition apparatus have been gradually settled as basic components of the parking management system.

In addition, a system for enabling drivers, and the like to easily confirm parking information around a destination and the possibility or impossibility of parking of a vehicle by providing parking information on a parking lot through a parking management system to the drivers, and the like through the Internet, a portable terminal, and the like has also been provided.

SUMMARY

The present disclosure has been provided to solve the above-mentioned problems occurring in the prior art while advantages achieved by the prior art are maintained intact.

An aspect of the present disclosure provides a system for providing parking information configured to provide parking available information indicating the possibility or impossibility of parking of a vehicle in a specific area and parking service information such as a parking discount provided from shops, service providers, or the like around the specific area to users in real time.

According to an exemplary embodiment of the present disclosure, a system for providing parking information includes: a wireless terminal configured to detect a current position of a vehicle and wirelessly perform data communication; and a server configured to receive a driving destination of the vehicle from the wireless terminal and control information on parking lots around the driving destination, in which the server may update and store the information on the parking lots in real time and respond to a request of the wireless terminal to transmit at least one of parking available information and parking fee information on the parking lots or parking service information provided by shops or service providers around the parking lots to the wireless terminal in real time.

The server is configured to respond to the request of the wireless terminal to transmit advertisement or facility information of the shops or the service providers to the wireless terminal in real time.

The parking available information may be the number of parking available spaces held by the parking lots at the moment of receiving the request of the wireless terminal or the number of parking available spaces expected to be held by the parking lots at an estimated arrival time of the vehicle at the parking lot.

The parking service information may be benefits provided in connection with a parking fee of the parking lots by the shops or the service providers in the case of using the shops or the service providers.

The server is configured to update and store the benefits in real time.

The server is configured to calculate a parking fee to be paid to the parking lot in real time in response to the request of the wireless terminal and transmit the calculated parking fee to the wireless terminal after the vehicle is parked in the parking lot.

The server is configured to transmit benefits provided in connection with a parking fee of the parking lots by the shops or the service providers to the wireless terminal in real time while transmitting the calculated parking fee, when using the shops or the service providers.

The server is configured to calculate the parking fee to be paid to the parking in real time based on the benefits and transmit the calculated parking fee to the wireless terminal, when using the shops or the service providers.

The server is configured to individually recognize the wireless terminal, store information on the shops or the service providers used by a holder of the recognized wireless terminal based on the recognized wireless terminal, and recommend at least one of the shops or the service providers to the holder in real time based on the stored use information.

BRIEF DESCRIPTION OF THE DRAWINGS

The above and other objects, features and advantages of the present disclosure will be more apparent from the following detailed description taken in conjunction with the accompanying drawings.

FIG. 2 is a diagram illustrating parking related information provided to a wireless terminal of a user, in the system for

DETAILED DESCRIPTION

Figure 1:
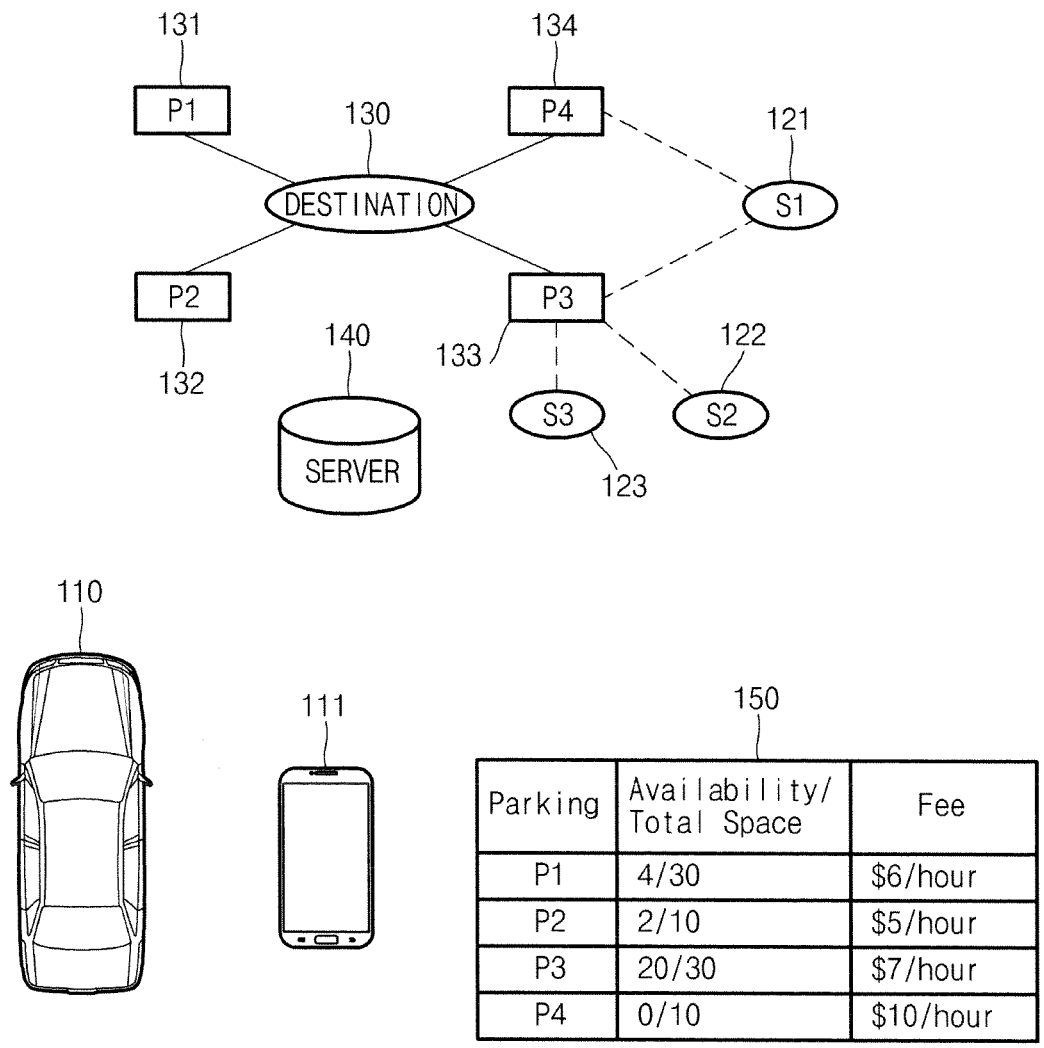
FIG. 1 is a diagram illustrating a system for providing parking information according to an exemplary embodiment of the present disclosure.

Advantages and features of the present disclosure and methods to achieve them will be elucidated from exemplary embodiments described below in detail with reference to the accompanying drawings. Therefore, the present disclosure is not limited to the exemplary embodiments set forth herein, but may be modified in many different forms. However, these exemplary embodiments are provided so that this disclosure will be thorough and completed, and will fully convey the technical spirit of the present disclosure to those skilled in the art.

In the drawings, the exemplary embodiments of the present disclosure are not limited to the illustrated specific form, but in order to clearly understand and/or easily embody the present disclosure, configurations of the present disclosure will be enlarged in the accompanying drawings. Herein, specific terms have been used in the present specification, but are just used for the purpose of describing the present disclosure and are not used for qualifying the meaning or limiting the scope of the present disclosure, which is disclosed in the appended claims.

In the present specification, terms 'and/or' are used as meaning including at least one of components arranged after and before any component. Further, expression 'connected/coupled' are used as a meaning including a case in which the parts are directly connected with each other and a case in which the parts are indirectly connected with each other with other elements interposed therebetween. Unless explicitly described to the contrary, a singular form includes a plural form in the present specification. In addition, components, steps, operations, and elements mentioned in the present specification do not exclude the existence or addition of one or more other components, steps, operations, and elements.

Hereinafter, exemplary embodiments of the present disclosure will be described in detail with reference to the accompanying drawings.

FIG. 1 is a diagram illustrating a system for providing parking information according to an exemplary embodiment of the present disclosure.

Referring to FIG. 1, a system for providing parking information may include a server 140 and a wireless terminal 111 and further include parking lots 131 to 134 around a destination 130 and shops or service providers 121 to 123 around the parking lots 131 to 134. Further, the wireless terminal 111 may be a portable wireless device (for example, smart phone, and the like) carried by a driver or a passenger of a vehicle 110 and an apparatus (for example, telematics unit, and the like) (not shown) equipped in the vehicle 110 to wirelessly perform data communication.

When the vehicle 110 is being driven toward a specific destination 130, there is a need to acquire information on the parking lots 131 to 134 where to park the vehicle around the specific destination 130. To this end, the driver or the passenger of the vehicle 110 searches for the parking lots 131 to 134 around the desired destination 130 and the information on the parking lots 131 to 134 using smart phones carried by them, and the like.

The server 140 is configured to store or manage the parking lots 131 to 134 around the specific area and the information on the parking lots 131 to 134. Here, the storage or the management includes updating the information changed in real time.

Here, the information 150 about the parking lots 131 to 134 may include the number of parking available spaces in the parking lots 131 to 134, positions of the spaces or a parking fee in the parking lots 131 to 134, and the like.

Further, in the system for providing parking information according to the exemplary embodiment of the present disclosure, the information about the parking lots 131 to 134 includes parking service information. When users use services, and the like that are provided by the shops or the service providers 121 to 123 around the parking lots 131 to 134, the parking service information includes benefits provided in connection with the parking of a vehicle to the users.

Therefore, in the system for providing parking information according to the exemplary embodiment of the present disclosure, when the wireless terminal 111 requests information on a specific parking lot 133 (for example, P3) from the server 140, the server 140 responds to the request to provide at least one of the number of parking available spaces and parking fee of the specific parking lot 133 or the parking service information provided by the shops or the service providers 121 to 123 around the specific parking lot 133 to the wireless terminal 111 in real time as soon as receiving a request for the at least one of them.

Consequently, according to the system for providing parking information according to the exemplary embodiment of the present disclosure, a holder of the wireless terminal 111 or the driver and the passenger of the vehicle 110 may acquire the information on the parking lots 131 to 134 around the desired destination 130 in real time and may figure out benefits which may be provided in connection with the parking of the vehicle 110 in real time when using services, and the like provided from the circumference of the destination 130, thereby getting a great help in a plan for a schedule and payment of a parking fee after the vehicle 110 is parked.

Further, the server according to the exemplary embodiment of the present disclosure may transmit advertisement of the shops or the service providers 121 to 123 or information on the corresponding facilities to the wireless terminal 111 in real time in response to the request of the wireless terminal 111 while transmitting the information on the parking lots 131 to 134 around the destination 130 to the wireless terminal 111 in real time in response to the request of the wireless terminal 111.

Further, the number of parking available spaces in the parking lots 131 to 134 among the information on the parking lots 131 to 134 may be the number of parking available spaces held by the parking lots 131 to 134 on the moment that the wireless terminal 111 requests the information on the parking lots 131 to 134 of the server 140 or the number of parking available spaces expected to be held by the parking lots 131 to 134 at estimated arrival time of the vehicle 110 at the parking lots 131 to 134.

Further, the server 140 according to the exemplary embodiment of the present disclosure may update and store the benefits provided in connection with the parking fee of the parking lots 131 to 134 from the shops or the service providers to the users in real time when the users use the shops or the service providers 121 to 123 and therefore may transmit the accurate information on the parking to the users wanting to use the parking lots 131 to 134.

Figure 2:
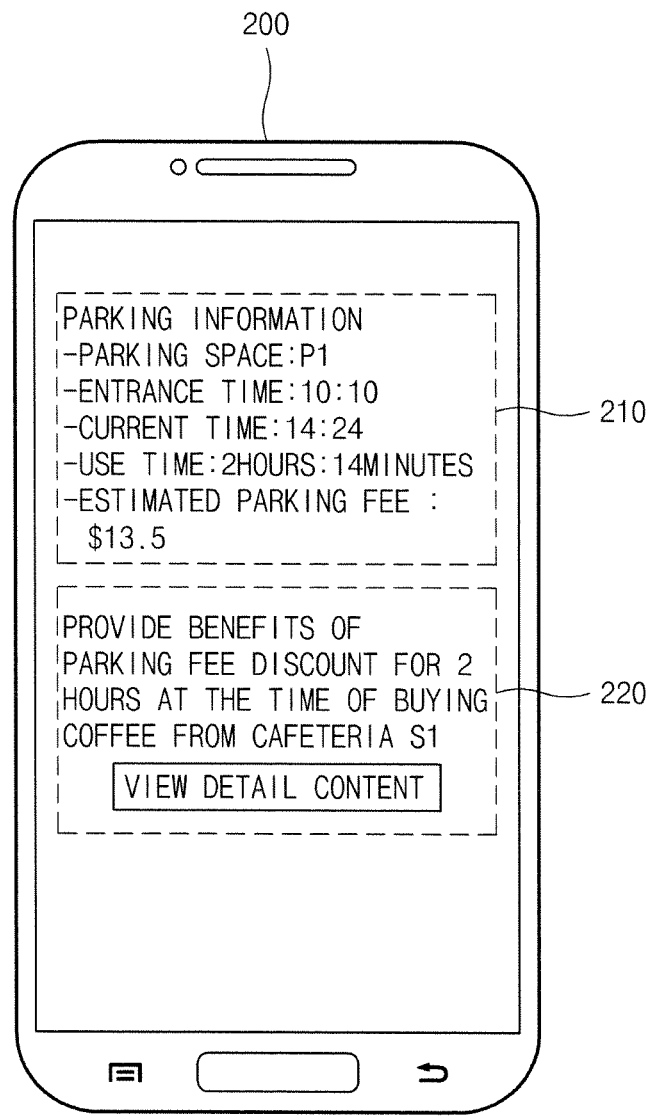

FIG. 2 is a diagram illustrating parking related information provided to a wireless terminal of a user, in the system for providing parking information according to the exemplary embodiment of the present disclosure.

Referring to FIG. 2, a display screen of a wireless terminal 200 includes information 210 on parking lots and parking service information 220. As described above, the information 210 on the parking lots includes parking fee information and when using shops or service providers 121 to 123 around the parking lots 131 to 134 in which vehicles are parked, the parking service information 220 includes information on benefits, which are provided in connection with the parking fee of the parking lot from the shops or the service providers 121 to 123 to the users.

Describing in detail, after the vehicle 110 is parked in one of the parking lots, when the wireless terminal 111 requests the information on the parking lots 131 to 134 including a parking fee, which is generated due to the parking of the vehicle 110 in one of the parking lots associated with the server 140, the server 140 responds to the request to be able to calculate the parking fee to be paid for the parking of the vehicle 110 in one of the parking lots in real time and transmit the calculated parking fee to the wireless terminal. Referring to FIG. 2, the parking fee calculated in real time, a parking space, an entrance time of the vehicle 110 into one of the parking lots, a current time, a parking use time, and the like which are transmitted from the server 140 may be displayed on the wireless terminal 200.

Further, when using the shops or the service providers 121 to 123 around the parking lots, 131 to 134 the server 140 may transmit the benefits 220 provided in connection with the parking fee of the parking lots 131 to 134 from the shops or the service providers 121 to 123 to the users to the wireless terminal 200 in real time while transmitting the calculated parking fee (210), and the like. Referring to FIG. 2, when a user buys a cup of coffee from a shop S1 around one of the parking lots, the benefits 220 show the information that he/she may use the parking lot free of charge for 2 hours.

Further, when a driver or a passenger of the vehicle 110 parked in one of the parking lots uses the shops or the service providers 121 to 123 around the parking lots 131 to 134, the server 140 in the system for providing parking information according to the exemplary embodiment of the present disclosure may calculate the parking fee in real time, including the benefits 220 provided to the driver or the passenger in the calculation of the parking fee. That is, the parking fee to be paid to the parking lot is calculated in real time based on the provided benefits 220 and then may be transmitted to the wireless terminal 200.

As the result, the system for providing parking information according to the exemplary embodiment of the present disclosure enables the driver or the passenger of the vehicle using the parking lot to recognize the parking lot use fee in real time and uses the shops or the service providers 121 to 123 around the parking lots 131 to 134 to reasonably save the parking lot use fee.

Further, the server in the system for providing parking information according to the exemplary embodiment of the present disclosure may individually recognize the wireless terminals carried by the driver or the passenger of the vehicle 110 based on identification information ID of the wireless terminals. That is, the information associated with the specific wireless terminal may be stored depending on the wireless terminal. As the result, the holder of the wireless terminal may store the information using the shops or the service providers 121 to 123 around the parking lots 131 to 134 based on the recognized wireless terminal and the server may recommend at least one shop or service provider of several shops or service providers 121 to 123 around the parking lots 131 to 134 to the holder of the recognized wireless terminal in real time based on the information using the shops or the service providers 121 to 123 stored for a predetermined period of time. As the result, operators of the shops or the service providers 121 to 123 around the parking lots may perform a business operation using target marketing and may expect activation of a local commercial area.

Consequently, the system for providing parking information according to the exemplary embodiment of the present disclosure provides the parking fee discount information, and the like, which are required in real life, in real time while providing the parking available information on the parking lots around the destination and therefore the user of the vehicle wanting to use the parking lot may acquire the parking fee discount information in real time without separate activities of search and information collection and the operator operating the shops or the service providers 121 to 123 around the parking lots 131 to 134 may also expect the activation of the business items such as operating services.

As described above, according to the exemplary embodiments of the present disclosure, a system for providing parking information provides the parking available information indicating the possibility or impossibility of parking of the vehicle 110 in the specific area and the parking service information such as a parking discount provided from the shops, service providers 121 to 123, or the like around the specific area to users in real time.

Hereinabove, although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not construed as being limited to the described exemplary embodiments but is defined by the appended claims as well as equivalents thereto. Considering the above contents, if the modifications and changes of the present disclosure belong to the range of the following claims and equivalents, the present disclosure is considered to include the changes and modifications of the present disclosure.

What is claimed is:

1. A system for providing parking information, comprising:
   a wireless terminal configured to detect a current position of a vehicle and wirelessly perform data communication; and
   a server configured to receive a driving destination of the vehicle from the wireless terminal and control information about parking lots around the driving destination,
   wherein the server updates and stores the information on the parking lots in real time and responds to a request of the wireless terminal to transmit at least one of parking available information and parking fee information at the parking lots or parking service information provided by shops or service providers associated with the parking lots to the wireless terminal in real time, and
   wherein the parking service information includes benefits provided in connection with a parking fee of the parking lots by the shops or the service providers in the case of using the shops or the service providers.

2. The system according to claim 1, wherein the server responds to the request of the wireless terminal to transmit advertisement or facility information of the shops or the service providers to the wireless terminal in real time.

3. The system according to claim 1, wherein the parking available information includes a number of parking available spaces held by the parking lots at the moment of receiving the request of the wireless terminal or the number of parking available spaces expected to be held by the parking lots at an estimated arrival time of the vehicle near the parking lots.

4. The system according to claim 1, wherein the server updates and stores the benefits in real time.

5. The system according to claim 1, wherein the server calculates a parking fee to be paid to one of the parking lots in real time in response to the request of the wireless terminal and transmits the calculated parking fee to the wireless terminal after the vehicle is parked in the one of the parking lots.

6. The system according to claim 5, wherein the server transmits benefits provided in connection with the parking fee of one of the parking lots by the shops or the service providers to the wireless terminal in real time while transmitting the calculated parking fee, when using the shops or the service providers.

7. The system according to claim 6, wherein the server calculates the parking fee to be paid to one of the parking lots in real time based on the benefits and transmits the calculated parking fee to the wireless terminal, when using the shops or the service providers.

8. The system according to claim 1, wherein the server individually recognizes the wireless terminal,
- stores information on the shops or the service providers used by a holder of the recognized wireless terminal based on the recognized wireless terminal, and
- recommends at least one of the shops or the service providers to the holder in real time based on the stored information.

* * * * *